(12) United States Patent
Oda

(10) Patent No.: US 10,137,373 B2
(45) Date of Patent: Nov. 27, 2018

(54) RECORDING MEDIUM, INFORMATION PROCESSING DEVICE AND INFORMATION PROCESSING METHOD

(71) Applicant: NINTENDO CO., LTD., Kyoto (JP)

(72) Inventor: Yoshinori Oda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 562 days.

(21) Appl. No.: 14/819,818

(22) Filed: Aug. 6, 2015

(65) Prior Publication Data

US 2016/0059124 A1    Mar. 3, 2016

(30) Foreign Application Priority Data

Aug. 26, 2014 (JP) ................................. 2014-171803

(51) Int. Cl.
| A63F 13/00 | (2014.01) |
| A63F 13/533 | (2014.01) |
| A63F 13/2145 | (2014.01) |
| A63F 13/22 | (2014.01) |
| A63F 13/92 | (2014.01) |

(52) U.S. Cl.
CPC ........ *A63F 13/533* (2014.09); *A63F 13/2145* (2014.09); *A63F 13/22* (2014.09); *A63F 13/92* (2014.09)

(58) Field of Classification Search
CPC ....... G07F 17/32; G06F 3/0486; G06F 1/1616
See application file for complete search history.

(56) References Cited

U.S. PATENT DOCUMENTS

| 2003/0137522 | A1 | 7/2003 | Kaasila et al. |
| 2011/0128247 | A1 | 6/2011 | Sensu |
| 2011/0141144 | A1* | 6/2011 | Tomono ................ G06F 3/0486 345/660 |
| 2012/0113019 | A1* | 5/2012 | Anderson ............. G06F 1/1616 345/173 |
| 2012/0274957 | A1 | 11/2012 | Sugiura et al. |

(Continued)

FOREIGN PATENT DOCUMENTS

| JP | 2000-353042 | 12/2000 |
| JP | 2005-164681 | 6/2005 |
| JP | 2006-524367 | 10/2006 |

(Continued)

*Primary Examiner* — Reginald Renwick
(74) *Attorney, Agent, or Firm* — Nixon & Vanderhye PC

(57) ABSTRACT

An example system includes: a display processing unit performing processing of displaying, on a display, an image concerning a processing result of an application and an operation receiving image for receiving an operation related to the application; a first operation reception unit receiving an operation associated with the operation receiving image by detecting contact with the operation receiving image through the touch panel; a second operation reception unit receiving an operation equivalent to operation associated with the operation receiving image through the operation for the hardware key; and an information processing unit performing information processing concerning the application in response to operation received by the first operation reception unit or the second operation reception unit. The display processing unit makes the operation receiving image non-display in the case where the second operation reception unit receives an operation.

12 Claims, 13 Drawing Sheets

(56) References Cited

U.S. PATENT DOCUMENTS

2013/0187855 A1 7/2013 Radakovitz et al.
2013/0321469 A1 12/2013 Tsuda et al.

FOREIGN PATENT DOCUMENTS

| JP | 2007-011862 | 1/2007 |
| JP | 2011-118584 | 6/2011 |
| JP | 2012-235320 | 11/2012 |
| JP | 2013-214863 | 10/2013 |
| JP | 2013-250772 | 12/2013 |

\* cited by examiner

FIG. 10

| OPERATION | HARDWARE KEY | TOUCH PANEL |
|---|---|---|
| SCROLLING | ANALOG STICK | SLIDING OPERATION |
| SELECT, DECIDE, CANCEL | CROSS KEY, A BUTTON, B BUTTON | TOUCHING OPERATION |
| ENLARGEMENT | X BUTTON | ENLARGEMENT OPERATION RECEIVING REGION |
| REDUCTION | Y BUTTON | REDUCTION OPERATION RECEIVING REGION |
| MENU | START BUTTON | MENU OPERATION RECEIVING REGION |
| BOOKMARK | SELECT BUTTON | BOOKMARK OPERATION RECEIVING REGION |
| BACKWARD | L BUTTON | BACKWARD OPERATION RECEIVING REGION |
| FORWARD | R BUTTON | FORWARD OPERATION RECEIVING REGION |

RECORDING MEDIUM, INFORMATION PROCESSING DEVICE AND INFORMATION PROCESSING METHOD

CROSS-REFERENCE TO RELATED APPLICATIONS

This application is based upon and claims the benefit of priority of the prior Japanese Patent Application No. 2014-171803, filed on Aug. 26, 2014, the entire contents of which are incorporated herein by reference.

FIELD

The present technique relates to a recording medium, information processing device, information processing system and information processing method configured to receive operation of a user through a hardware key and a touch panel.

BACKGROUND AND SUMMARY

Information processing devices, such as a smartphone, tablet terminal device and the like, which receive user operations through touch panels have widely been spread. In the conventional game machine, game operation using a hardware key is generally performed. A recent game machine includes a touch panel in addition to a hardware key, and can receive the operation of the user by combining them together. Other than the game machine, such an information processing device is also present that includes both a hardware key and a touch panel, such as a PC (Personal Computer) or a mobile phone, for example.

According to an aspect of the embodiment, a recording medium in which an information processing program is recorded causes an information processing device including a display, a hardware key and a touch panel on the display to operate as: a display processing unit performing processing of displaying, on the display, an image concerning a processing result of an application and an operation receiving image for receiving an operation related to the application; a first operation reception unit receiving an operation associated with the operation receiving image by detecting contact with the operation receiving image through the touch panel; a second operation reception unit receiving an operation equivalent to the operation associated with the operation receiving image through operation for the hardware key; and an information processing unit performing information processing concerning the application in response to operation received by the first operation reception unit or the second operation reception unit. The display processing unit makes the operation receiving image non-display in the case where the second operation reception unit receives an operation.

The object and advantages of the present technique will be realized and attained by means of the elements and combinations particularly pointed out in the claims. It is to be understood that both the foregoing general description and the following detailed description are exemplary and explanatory and are not restrictive of the present technique.

The above and further objects and features of the present technique will more fully be apparent from the following detailed description with accompanying drawings.

BRIEF DESCRIPTION OF THE DRAWINGS

FIG. 10 is an example non-limiting table chart illustrating association between the operation for hardware keys and the operation for a touch panel:

DETAILED DESCRIPTION OF NON-LIMITING EXAMPLE EMBODIMENTS

Device Configuration

Figure 1:
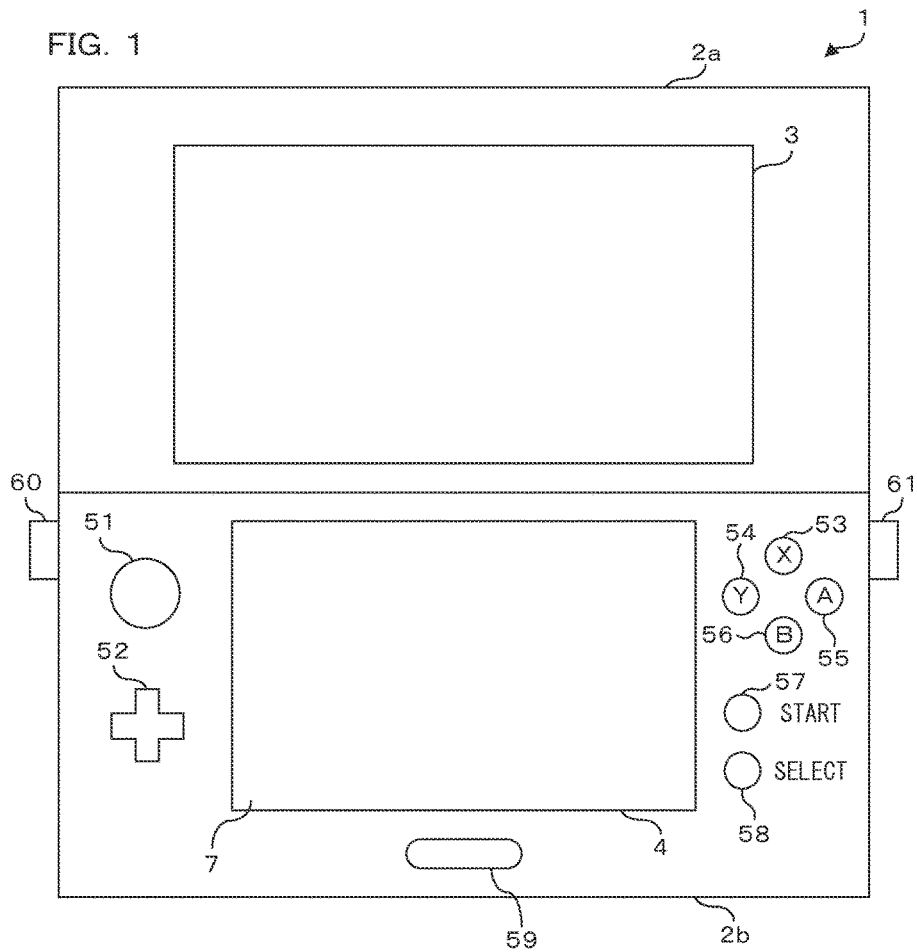
FIG. 1 shows an example non-limiting schematic view illustrating the outer appearance of a game machine according to the present embodiment.

FIG. 1 shows an example non-limiting schematic view illustrating the outer appearance of a game machine according to the present embodiment. A game machine 1 according to the present embodiment is a handheld type operable by the user holding it with a hand. A casing of the game machine 1 has such a configuration that the first casing 2a and the second casing 2b formed in the shape of substantially rectangular plates are foldably connected with each other via a hinge mechanism or the like. On one surface of the first casing 2a (surface hidden inside when the casing is folded), the first display 3 is located. Furthermore, on one surface of the second casing 2b (surface hidden inside when the casing is folded), the second display 4 is located at substantially the middle. The first display 3 is wider in the lateral direction than the second display 4.

The second casing 2b of the game machine 1 is provided with a plurality of keys, buttons or the like for the user to perform operation. On one surface of the second casing 2b, an analog stick 51 is located at the upper side whereas a cross key 52 is located at the lower side in a portion next to the second display 4 to the left. On the second casing 2b, four push buttons 53 to 56 are located at the upper side in a portion next to the second display 4 to the right. The four push buttons 53 to 56 are arranged at the upper, lower, left and right sides to form the apices of a diamond. The four push buttons 53 to 56 are denoted by characters of "X," "Y," "A" and "B," respectively. Hereinafter, the push button 53 at the upper side denoted by "X" is referred to as an X button 53. The push button 53 at the left side denoted by "Y" is referred to as a Y button 54. The push button 55 at the right side denoted by "A" is referred to as an A button 55. The push button 56 at the lower side denoted by "B" is referred to as a B button 56. In the second casing 2b, two push buttons 57 and 58 are vertically arranged at the lower side in a portion next to the second display 4 to the right. Letters of "START" are indicated at the right side of the push button 57 located at the upper part. Letters of "SELECT" are indicated at the right side of the push button 58 located at the lower part. Hereinafter, the push button 57 is referred to as a start button 57. The push button 58 is referred to as a select button 58. The second casing 2b is provided with one push button 59 at the lower side of the second display 4, which is hereinafter referred to as a home button 59.

On the side surfaces of the second casing 2b of the game machine 1, push buttons 60 and 61 are located at the left and right sides of the second display 4 in the front view. Hereinafter, the push button 60 at the left side is referred to as an L button 60 whereas the push button 61 at the right side is referred to as an R button 61.

The second display 4 of the game machine 1 is provided with a touch panel 7. The touch panel 7 detects contact operation of the user for the second display 4. In the present embodiment, no touch panel is provided on the first display 3 of the game machine 1. However, a configuration may also be possible where a touch panel is provided on the first display 3.

Figure 2:
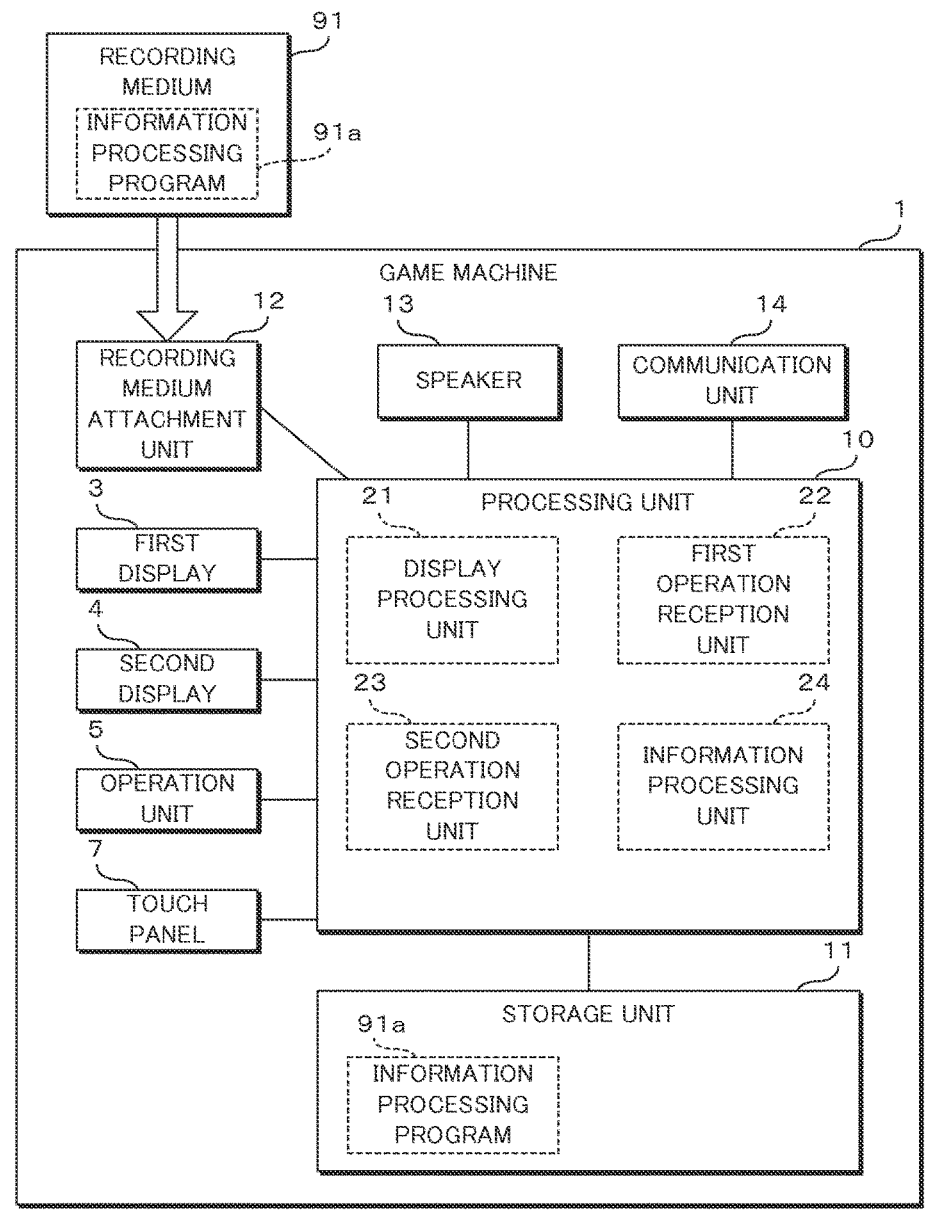
FIG. 2 shows an example non-limiting block diagram illustrating the configuration of a game machine.

FIG. 2 shows an example non-limiting block diagram illustrating the configuration of a game machine 1. The game machine 1 according to the present embodiment includes, for example, the first display 3, the second display 4, an operation unit 5, a touch panel 7, a processing unit 10, a storage unit 11, a recording medium attachment unit 12, a speaker 13 and a communication unit 14. The first display 3 and the second display 4 have different sizes, as illustrated in FIG. 1, each of which is constituted by, for example, a liquid-crystal panel or the like. The first display 3 and the second display 4 respectively display images based on image signals applied from the processing unit 10.

The operation unit 5 is constituted by including hardware keys such as the analog stick 51, cross key 52, X button 53, Y button 54, A button 55, B button 56, start button 57, select button 58, home button 59, L button 60, R button 61 and the like. The operation unit 5 detects the operation of the user performed for the hardware keys, and applies a signal in response to the operation to the processing unit 10. Note that the operation unit 5 may further include a hardware key not illustrated in FIG. 1 such as a power switch or volume switch, for example.

The touch panel 7 is located on the surface of the second display 4. The touch panel 7 detects the contact operation with the second display 4, i.e., the contact operation with the image displayed on the second display 4, by the user. Different types may be employed for the touch panel 7, such as an electrostatic capacitance type or a resistance film type. The touch panel 7 notifies the processing unit 10 of coordinate information on a position of contact when the contact operation is detected.

The processing unit 10 is constituted by using an arithmetic processing device such as a CPU (Central Processing Unit). The processing unit 10 reads out and executes an information processing program 91a stored in a storage unit 11, to perform various information processing. The processing unit 10 may output an image according to the result of information processing to the first display 3 and the second display 4, so as to display the image. It is to be noted that the information processing program 91a may also be included in a program such as an operating system, for example. The storage unit 11 is constituted by a semiconductor memory device, a hard disk drive or the like. The storage unit 11 stores various programs such as the information processing program 91a as well as data necessary for executing the programs.

The recording medium attachment unit 12 is so configured that a recording medium 91 of a card type, a cassette type, a disk type or the like is attached thereto and removed therefrom. The processing unit 10 reads out the information processing program 91a and various kinds of data from a recording medium 91 attached to the recording medium attachment unit 12, and stores them in the storage unit 11. This allows for installation of the information processing program 91a to the game machine 1, or updating of the information processing program 91a, for example. The processing unit 10 reads out and executes the information processing program 91a installed in the storage unit 11. The installation, updating or the like of the information processing program 91a may also be performed through communication with a server device or the like by the communication unit 14.

The speaker 13 is to output sound such as BGM and sound effects. The speaker 13 outputs sound based on sound data or sound signals supplied from the processing unit 10. The communication unit 14 transmits/receives information to/from the server device, another game machine 1 or the like via a network such as the Internet, for example. For example, the game machine 1 accesses the Internet through the communication unit 14 to display a Web page.

In the game machine 1 according to the present embodiment, by the processing unit 10 executing the information processing program 91a, a display processing unit 21, a first operation reception unit 22, a second operation reception unit 23, an information processing unit 24 and the like are implemented by the processing unit 10 as software functional blocks. In the present embodiment, the information processing program 91a is a program for communicating with a server device or the like through the communication unit 14 via the Internet, obtaining data for displaying a Web page and displaying the Web page on the first display 3 and the second display 4. That is, the information processing program 91a according to the present embodiment is a so-called browser program, and an application program for the user to view a Web page.

The display processing unit 21 performs processing of displaying an image obtained as a result of information processing performed by the information processing unit 24 on the first display 3 and the second display 4. The display processing unit 21 performs processing of displaying, for example, a Web page obtained via the Internet on the first display 3 and the second display 4. The display processing unit 21 performs processing of displaying, for example, an image such as an icon, a tool bar, a task bar or a menu screen for assisting the operation of the user on the first display 3 and/or the second display 4. Moreover, the display processing unit 21 performs processing of displaying an error message, a system message or the like on the first display 3 and/or the second display 4.

The first operation reception unit 22 receives an operation of the user based on the result of detection by the touch panel 7. The first operation reception unit 22 receives selecting operation, deciding operation and the like for a link, an image or the like included in a Web page displayed on the second display 4 based on touching operation, tapping operation or the like for the page, for example. The first operation reception unit 22 receives an operation of sliding a Web page displayed on the first display 3 and the second display 4 in the up-down and right-left directions based on, for example, sliding operation, flicking operation or swiping operation. The first operation reception unit 22 receives an operation associated with an image such as an icon or a tool bar displayed on the second display 4, for example, based on the touching operation, tapping operation or the like for the image.

The second operation reception unit 23 receives an operation of the user based on the result of detection by the operation unit 5. In an application of the Internet browser implemented by the processing unit 10 executing the information processing program 91a according to the present embodiment, the second operation reception unit 23 may receive through the operation unit 5 the operation having substantially the same content (equivalent operation) as the operation received by the first operation reception unit 22 through the touch panel 7. The second operation reception unit 23 receives selecting operation for a link, an image or the like included in the Web page displayed on the second display 4 through, for example, the operation for the cross key 52, and receives deciding operation for the link, image or the like selected by the operation for the A button 55.

The information processing unit 24 performs various kinds of information processing for implementing an Internet browser. The information processing unit 24 performs communication with another server device or the like via the Internet through the communication unit 14 so as to obtain data of a Web page the user wishes to browse, based on the operation received by the first operation reception unit 22 or the second operation reception unit 23, for example. The information processing unit 24 performs processing of managing address information on a specific Web page registered by the user for accessing the page, as a bookmark, a favorite or the like.

<Internet Browser Application>

Figure 3:
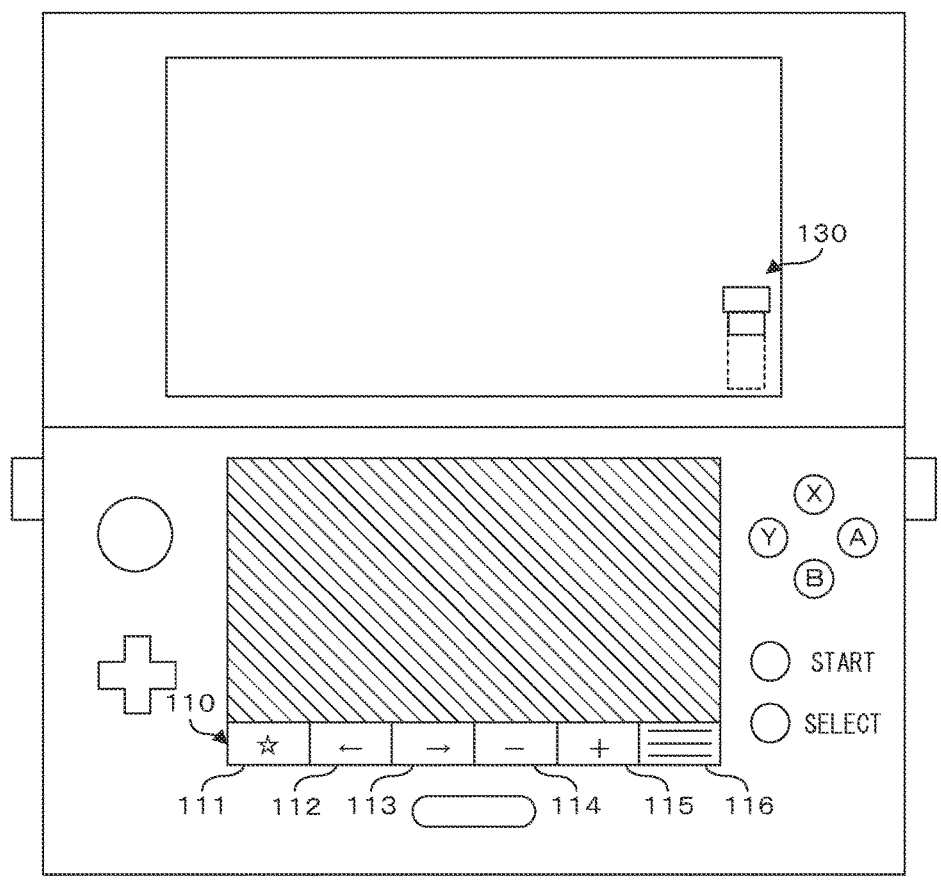
FIG. 3 shows an example non-limiting schematic view illustrating application processing performed by a game machine according to the present embodiment.

FIG. 3 shows an example non-limiting schematic view illustrating application processing performed by a game machine 1 according to the present embodiment. FIG. 3 illustrates the state immediately after the processing unit 10 of the game machine 1 starts executing the information processing program 91a and an Internet browser is activated. The components denoted by reference characters in FIG. 1 are not be provided with reference characters in FIG. 3.

In the case where the game machine 1 according to the present embodiment activates an Internet browser based on the information processing program 91a, data of a specific Web page registered as a start page or the like for example is obtained by the information processing unit 24 communicating with a server device via the Internet through the communication unit 14. The display processing unit 21 of the game machine 1 displays a Web page on the second display 4 based on the data obtained by the information processing unit 24. In FIG. 3 or similar drawings thereafter, a Web page displayed by the game machine 1 is illustrated as a hatched region. As illustrated in FIG. 3, immediately after an Internet browser is activated, the display processing unit 21 displays a Web page on the second display 4, but not on the first display 3. Here, the display processing unit 21 may display, for example, a wallpaper image registered by the user on the first display 3.

The display processing unit 21 of the game machine 1 according to the present embodiment displays a tool bar 110 in a lower region of the second display 4. The tool bar 110 has a laterally-long rectangular shape provided along the lower side of the second display 4, and is divided into six regions. The six regions of the tool bar 110 are arranged side by side in the left-right direction, and includes, from the left, a bookmark operation receiving region 111, a backward operation receiving region 112, a forward operation receiving region 113, a reduction operation receiving region 114, an enlargement operation receiving region 115 and a menu operation receiving region 116 in this order. The tool bar 110 is to receive operation of the user through the touch panel 7. In the case where the touching operation for each region in the tool bar 110 is performed by the user, the first operation reception unit 22 of the game machine 1 receives an operation associated with each region.

Figure 4:
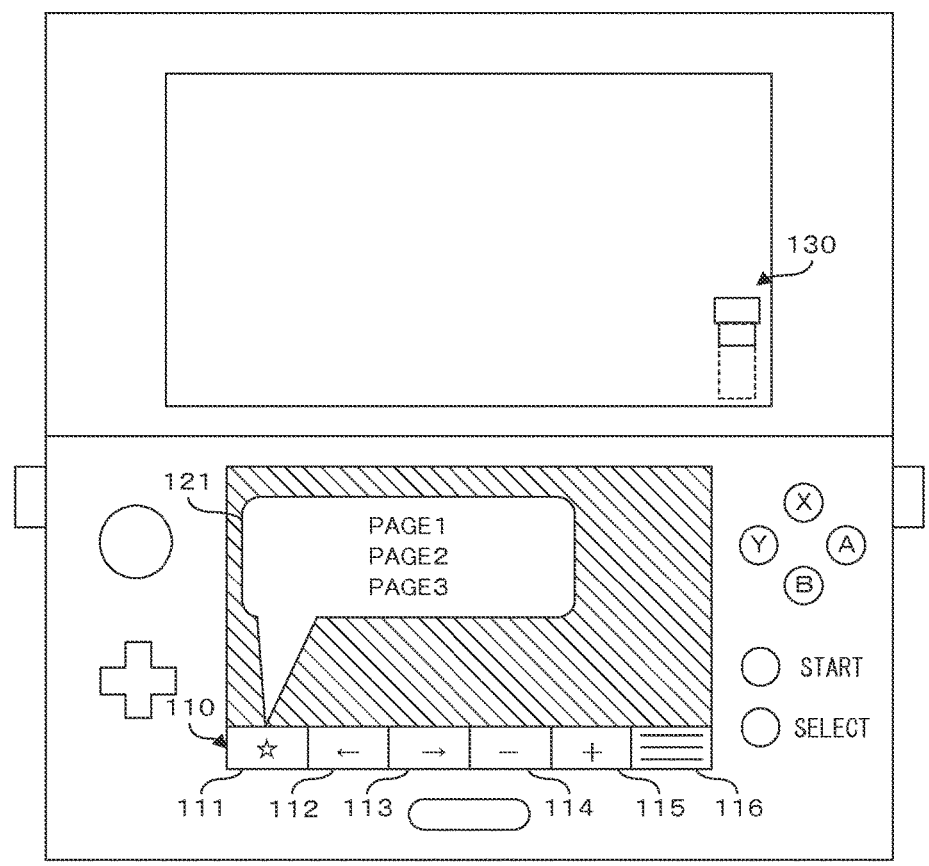
FIG. 4 shows a non-limiting display example of a bookmark.

The bookmark operation receiving region 111 in the tool bar 110 is to display a Web page registered by the user as a bookmark. In the case where the touching operation for the bookmark operation receiving region 111 is received by the first operation reception unit 22, the information processing unit 24 of the game machine 1 reads out information on a bookmark stored in the storage unit 11 or the like. The display processing unit 21 of the game machine 1 displays, for example, a list of names of Web pages registered by the user on the second display 4 based on the information read out by the information processing unit 24. FIG. 4 shows a non-limiting display example of a bookmark. The display processing unit 21 displays a balloon 121 on the second display 4 while displaying a list of the names of registered Web pages in the balloon 121. The neck part of the balloon 121 is located above the bookmark operation receiving region 111 or at the periphery thereof, which expresses that the balloon 121 is displayed in association with the bookmark operation receiving region 111. The first operation reception unit 22 may receive the touching operation for each name in the balloon 121. If the first operation reception unit 22 receives the touching operation for any one of the names, the information processing unit 24 performs communication processing so as to obtain data of the Web page concerning the name. Based on the data obtained by the information processing unit 24, the display processing unit 21 displays a Web page on the second display 4.

The backward operation receiving region 112 in the tool bar 110 is to return the first display 3 and the second display 4 to the previously displayed Web page. The information processing unit 24 of the game machine 1 stores, in the storage unit 11, data of, for example, several to several tens of the Web pages that have been displayed. In the case where the touching operation for the backward operation receiving region 112 is received by the first operation reception unit 22, the information processing unit 24 reads out data of the Web page, which is one before the current page, and displays a Web page by the display processing unit 21 based on the read-out data. On the other hand, the forward operation receiving region 113 in the tool bar 110 is to forward the display that has been returned by the touching operation for the backward operation receiving region 112 described above. In the case where the touching operation for the forward operation receiving region 113 is received by the first operation reception unit 22, the information processing unit 24 reads out data which is one after the current display, and the display processing unit 21 performs display based on the data.

The reduction operation receiving region 114 in the tool bar 110 is to reduce the size of the Web page displayed on the first display 3 and the second display 4. Every time the touching operation for the reduction operation receiving region 114 is received by the first operation reception unit 22, the display processing unit 21 displays the Web page displayed on the first display 3 and the second display 4 by reducing it by, for example, 10%. Moreover, the enlargement operation receiving region 115 in the tool bar 110 is to enlarge the Web page displayed on the first display 3 and the second display and to display the enlarged page. Every time the touching operation for the enlargement operation receiving region 115 is received by the first operation reception unit 22, the display processing unit 21 displays the Web page displayed on the first display 3 and the second display 4 by enlarging it by, for example, 10%.

Figure 5:
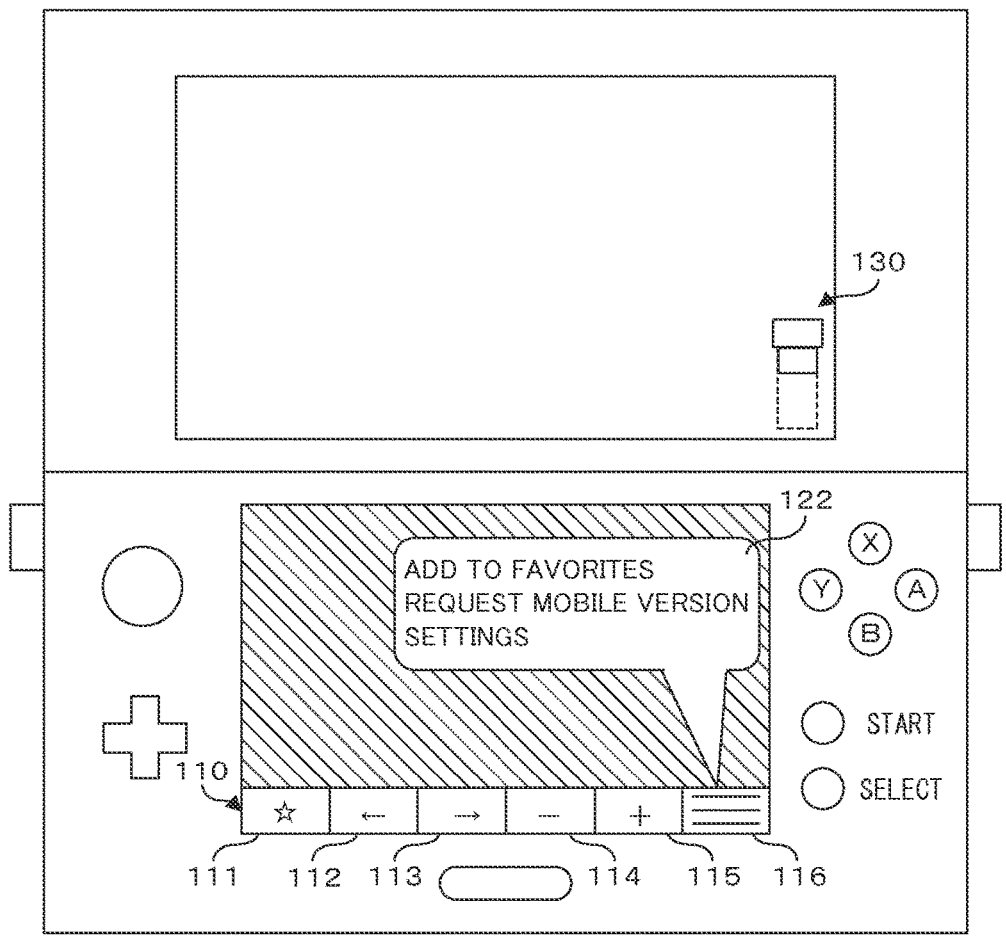
FIG. 5 is a non-limiting display example of a menu screen.

The menu operation receiving region 116 in the tool bar 110 is to display a menu screen for performing various types of settings and the like on the second display 4. In the case where the touching operation for the menu operation receiving region 116 is received by the first operation reception unit 22, the display processing unit 21 displays a menu screen on the second display 4. FIG. 5 is a non-limiting display example of a menu screen. The display processing unit 21 displays a balloon 122 on the second display 4, and displays the list of menu items that are further selectable by the user in the balloon 122. In the illustrated example, the menu items of "add to favorites" "request mobile version" and "settings" are displayed. The neck part of the balloon 122 is located above the menu operation receiving region 116 or at a periphery thereof, which expresses that the balloon 122 is displayed in association with the menu operation receiving region 116. The first operation reception unit 22 may receive the touching operation for each menu item in the balloon 122. If the first operation reception unit 22 receives the touching operation for any one of the menu items, information processing according to the menu item is performed by the information processing unit 24. If, for example, the menu item of "add to favorites" is selected, the information processing unit 24 performs processing of registering the Web page that have been displayed on the first display 3 and the second display 4 at that time point in the bookmark. If, for example, the menu item of "request mobile version" is selected, the information processing unit 24 performs processing of requesting data transmission in a mobile version of a Web page displayed at that time point from a server device. If, for example, the menu item of "settings" is selected, the information processing unit 24 performs processing of displaying a setting screen (not illustrated) for various settings related to the Internet browser on the second display 4.

The display processing unit 21 of the game machine 1 according to the present embodiment displays, on the first display 3, a notification image 130 for notifying the user of a portion being displayed at the present time point among the entire Web page being accessed. The notification image 130 illustrated in FIG. 5 and so forth includes the first image indicated by a solid line and the second image indicated by a broken line. The first image in the notification image 130 corresponds to an image in the form of two rectangles having different sizes that are connected vertically with each other. The first image is to imitate the first display 3 and the second display 4 of the game machine 1. That is, the large rectangle at the upper side of the first image indicates the first display 3 whereas the small rectangle at the lower side thereof indicates the second display 4. The second image in the notification image 130 forms a rectangular shape and indicates the entire Web page.

The notification image 130 displayed by the display processing unit 21 is a semitransparent image. The user can view a background image and a Web page displayed on the first display 3 by seeing through the notification image 130. The display processing unit 21 displays the notification image 130 in the lower right region of the first display 3. As described above, the first display 3 and the second display 4 of the game machine 1 have different sizes, the first display 3 being wider in the left-right direction than the second display 4. The display processing unit 21 displays the notification image 130 on the first display 3 so as to place the notification image 130 more right than the position of the rightmost end of the second display 4. That is, in the case where a Web page having the same width as that of the second display 4 is displayed on the first display 3, the Web page is displayed on the first display 3 without being overlapped with the notification image 130 (see FIG. 6). This can prevent the notification image 130 from blocking the view of the Web page displayed on the first display 3.

The notification image 130 displayed by the display processing unit 21 expresses the displayed portion among the entire Web page by the overlapped first and second images. In the case where a new Web page is accessed, the display processing unit 21 of the game machine 1 according to the present embodiment displays the Web page on the second display 4, not on the first display 3, as illustrated in FIG. 3. The display processing unit 21 so displays that the upper end of the Web page corresponds to the upper end of the second display 4. The display processing unit 21 so displays that the left and right ends of the Web page corresponds to the left and right ends of the second display 4. The notification image 130 here is a small rectangle at the lower side of the first image being overlapped with the upper portion of the second image.

Figure 6:
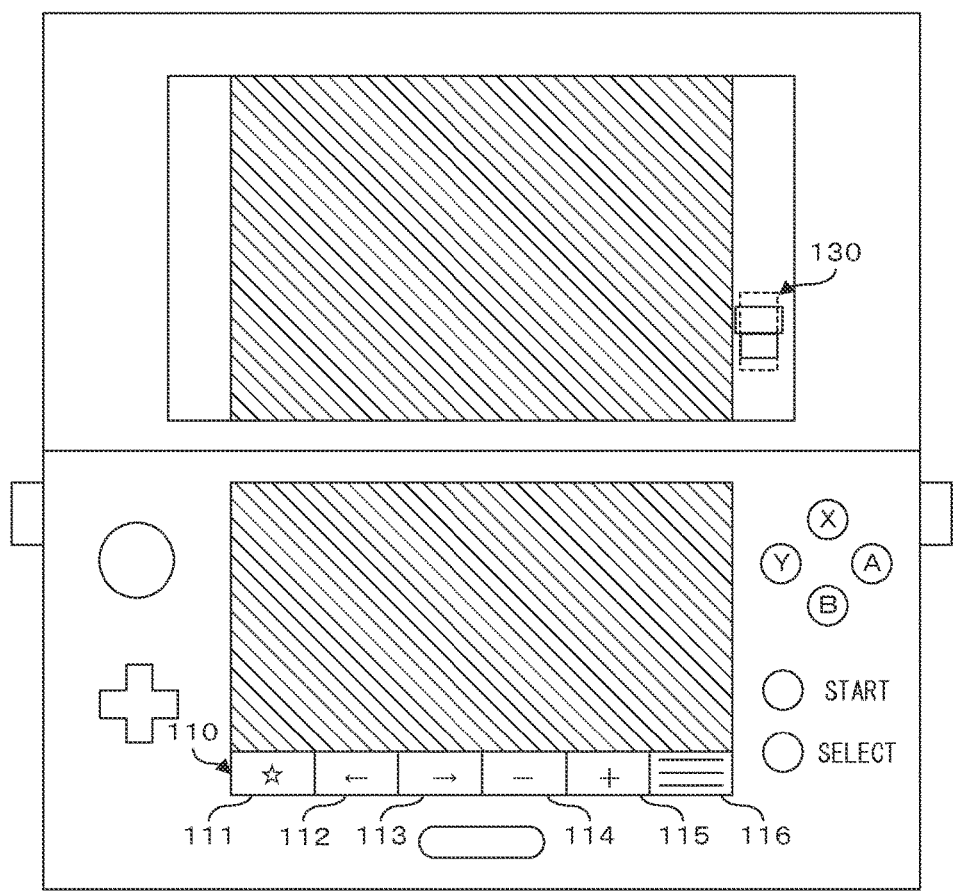
FIG. 6 is a non-limiting display example in the case where scroll operation is performed.

For example, in the game machine 1 of the state illustrated in FIG. 3, if the user moves the position of contact with the touch panel 7 from the lower part to the upper part to perform sliding operation in the upward direction, the first operation reception unit 22 receives this operation as scroll operation for the displayed Web page. If the scroll operation is received by the first operation reception unit 22, the display processing unit 21 scrolls the Web page. FIG. 6 is a display example in the case where the scroll operation is performed. If the scroll operation in the upward direction is received by the first operation reception unit 22 in the state as illustrated in FIG. 3, the display processing unit 21 scrolls the Web page displayed on the second display 4 in the upward direction. Here, the display processing unit 21 displays the upper portion of the Web page, which is now out of the display area of the second display 4 as a result of the scrolling in the upward direction, on the first display 3 and scrolls the Web page upward, as illustrated in FIG. 6. The notification image 130 illustrated in FIG. 6 is the first image superposed onto substantially the middle of the second image. In the case where the first operation reception unit 22 receives the scroll operation in the downward direction thereafter, the display processing unit 21 scrolls the Web page in the downward direction to display the Web page.

Figure 7:
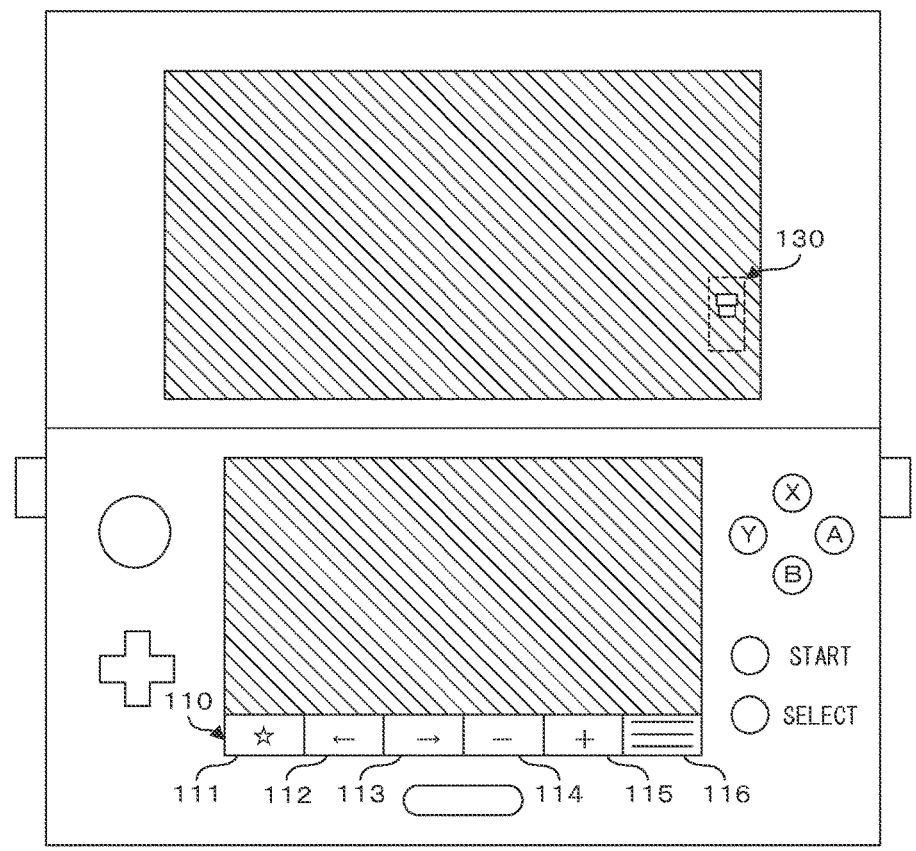
FIG. 7 is a non-limiting display example in the case where enlargement operation is performed.

For example, in the game machine 1 of the state illustrated in FIG. 6, if the user performs the touching operation for an enlargement operation receiving region 115 in the tool bar 110, the operation is received by the first operation reception unit 22 as enlargement operation for a Web page. FIG. 7 is a non-limiting display example in the case where enlargement operation is performed. If the first operation reception unit 22 receives the enlargement operation, the display processing unit 21 enlarges and displays a Web page displayed on the first display 3 and the second display 4. Though no Web page is displayed near the right and left ends of the first display 3 in FIG. 6, the enlargement operation allows the entire first display 3 to display a Web page as illustrated in FIG. 7. The notification image 130 illustrated in FIG. 7 includes the first image which is reduced and overlapped with the second image. In this state, the first operation reception unit 22 receives scroll operation in any of the upper, lower, right and left directions, and the display processing unit 21 scrolls the Web page in the direction according to the received scroll operation.

Figure 8:
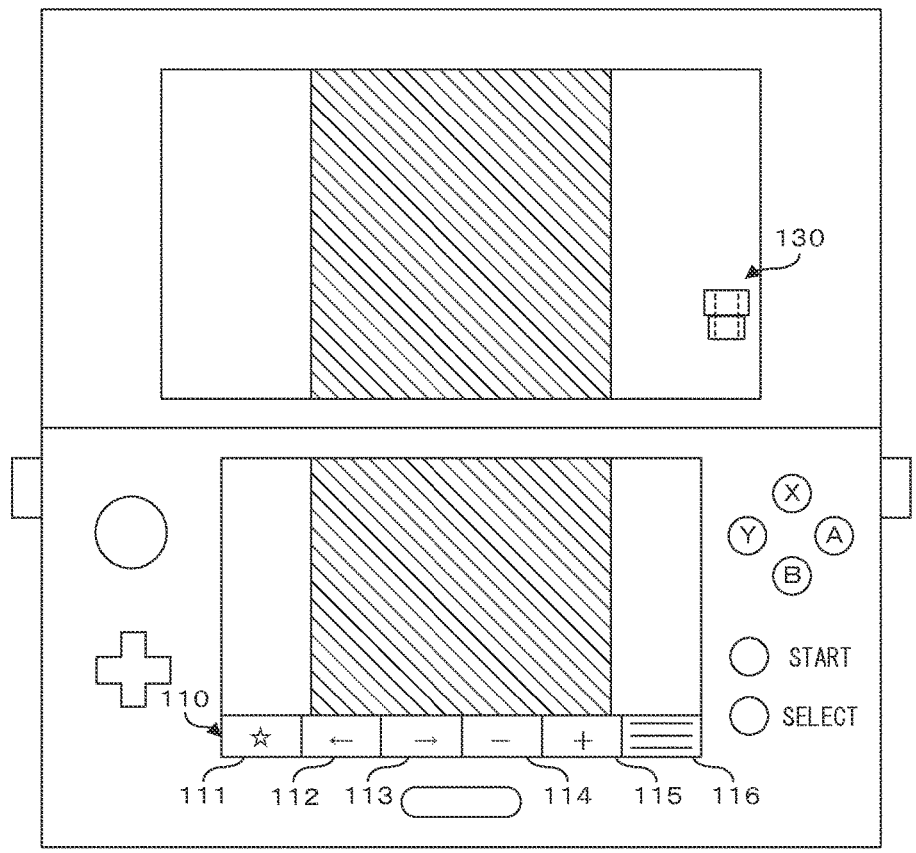
FIG. 8 is a non-limiting display example in the case where reduction operation is performed.

To the contrary, in the case where the user performs touching operation for the reduction operation receiving region 114 in the tool bar 110 in the game machine 1 of the state as illustrated in FIG. 6, for example, the first operation reception unit 22 receives this operation as reduction operation for a Web page. FIG. 8 is a non-limiting display example in the case where reduction operation is performed. If the first operation reception unit 22 receives reduction operation, the display processing unit 21 reduces the Web page displayed on the first display 3 and the second display 4, and displays the reduced Web page. Here, the notification image 130 includes the second image which is reduced and overlapped with the first image.

Figure 9:
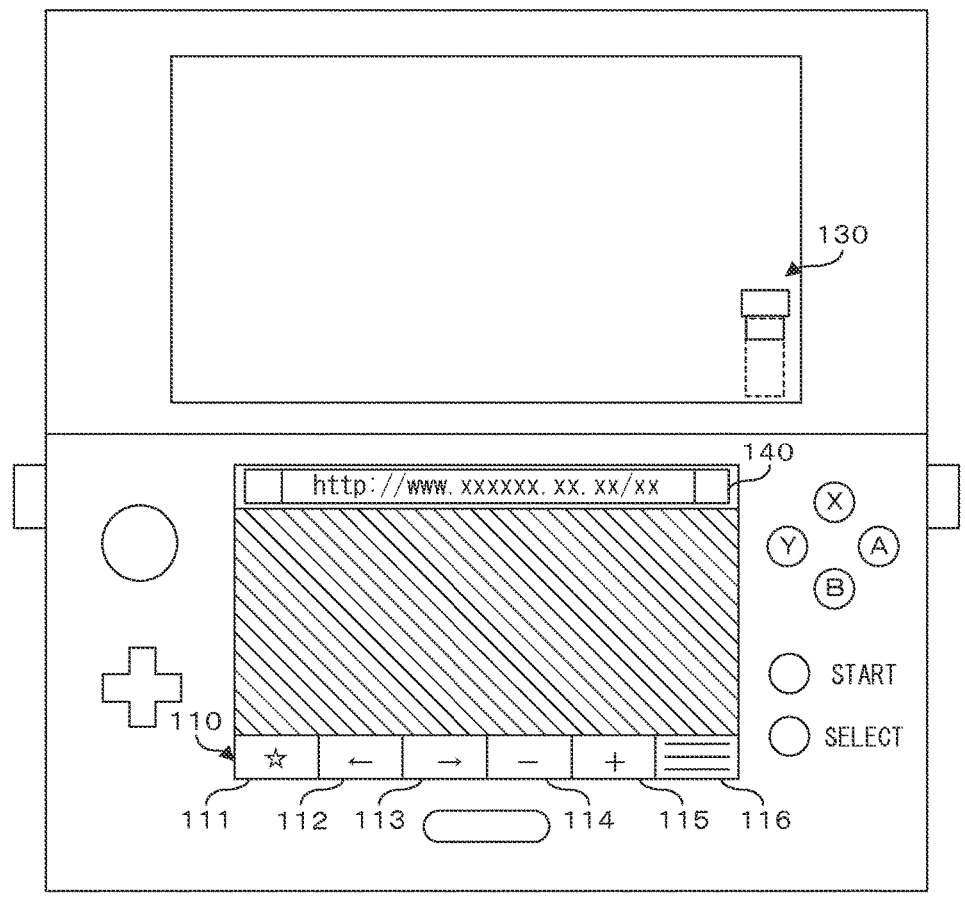
FIG. 9 is a non-limiting display example of an address bar.

In the case where the first operation reception unit 22 receives the scroll operation in the downward direction in the game machine 1 of the state as illustrated in FIG. 3, for example, the display processing unit 21 does not scroll the displayed Web page in the downward direction. In the game machine 1 according to the present embodiment, the display processing unit 21 displays an address bar on the second display 4 in such a case. FIG. 9 is a non-limiting display example of an address bar. If the scroll operation in the downward direction is received in the state where a Web page is displayed only on the second display 4, the display processing unit 21 of the game machine 1 according to the present embodiment displays an address bar 140 in the upper region of the second display 4. The address bar 140 has a laterally-long rectangular shape provided along the upper side of the second display 4, and includes a box for inputting the address of a Web page. If the scroll operation in the upward direction is received in the state where the address bar 140 is displayed, the display processing unit 21 hides the address bar 140.

It is to be noted that the display processing unit 21 may also display a software keyboard for inputting characters on the second display 4 together with the address bar 140. The user may input an arbitrary address, character strings or the like in the box of the address bar 140. If an address is input in the box of the address bar 140, the information processing unit 24 accesses the input address via the Internet through the communication unit 14, and communicates with a server device or the like offering data of the Web page concerning the address. The communication allows the display processing unit 21 to display a Web page based on the data obtained by the information processing unit 24. If character strings other than an address is input in the box of the address bar 140, the information processing unit 24 conducts an Internet search using the input character strings as a keyword, and displays the search result by the display processing unit 21.

<Operation with Hardware Key>

In the game machine 1 according to the present embodiment, the user may perform the operation for an Internet browser as described above with the use of the touch panel 7, while performing similar operation using the operation unit 5 provided as a hardware key. FIG. 10 is an example non-limiting table chart illustrating association between the operation of hardware keys and the operation of a touch panel. In the game machine 1 according to the present embodiment, the user may perform the operation of scrolling Web page displayed on the first display 3 and the second display 4 by sliding operation for the touch panel 7, and also by utilizing the analog stick 51 of the operation unit 5. If the second operation reception unit 23 in the game machine 1 receives the operation for the analog stick 51, the display processing unit 21 scrolls the Web page in the direction according to the operation direction of the analog stick 51.

In the game machine 1, the user can realize selection of a link, an image or the like included in the Web page displayed on the first display 3 and the second display 4 by performing direct touching operation for a desired link, image or the like with the use of the touch panel 7. In the case where similar operation is performed by the operation unit 5, the user operates the cross key 52 to move a cursor (not illustrated) so as to select a desired link, image or the like, and performs pushing operation for the A button 55 to decide the selection. Accordingly, if the second operation reception unit 23 receives the operation for the cross key 52, the display processing unit 21 displays a cursor on the first display 3 and the second display 4.

In the game machine 1, in the case where the bookmark screen, menu screen or the like displayed on the second display 4 is not displayed, the user may utilize the touch panel 7 to perform operation of touching the outside of the balloons 121 or 122 constituting the bookmark screen or menu screen, for example. Moreover, by repeating the touching operation for the bookmark operation receiving region 111 or the menu operation receiving region 116 in the tool bar 110, the user can switch the bookmark screen or menu screen between display and non-display. In the case where similar operation is performed at the operation unit 5, the user may perform pushing operation for the B button 56 to switch the displayed bookmark screen, menu screen or the like to non-display. The second operation reception unit 23 of the game machine 1 receives the pushing operation for the B button 56 as so-called canceling operation. By repeating the pushing operation for the select button 58 corresponding to the display of the bookmark screen, the user can switch the bookmark screen between display and non-display. By repeating the pushing operation for the start button 57 corresponding to the display of the menu screen, the user can switch the menu screen between display and non-display.

In the game machine 1, the six operation receiving regions in the tool bar 110 are associated with the six hardware keys in the operation unit 5, respectively. The touching operation for the bookmark operation receiving region 111 in the tool bar 110 is associated with the pushing operation for the select button 58. The touching operation for the backward operation receiving region 112 is associated with the pushing operation for the L button 60. The touching operation for the forward operation receiving region 113 is associated with the pushing operation for the R button 61. The touching operation for the reduction operation receiving region 114 is associated with the pushing operation for the Y button 54. The touching operation for the enlargement operation receiving region 115 is associated with the pushing operation for the X button 53. The touching operation for the menu operation receiving region 116 is associated with the pushing operation for the start button 57. If the second operation reception unit 23 receives pushing operation for these hardware keys, the game machine 1 performs processing similar to that in the case where the first operation reception unit 22 receives the touching operation for each operation receiving region in the tool bar 110.

Figure 11:
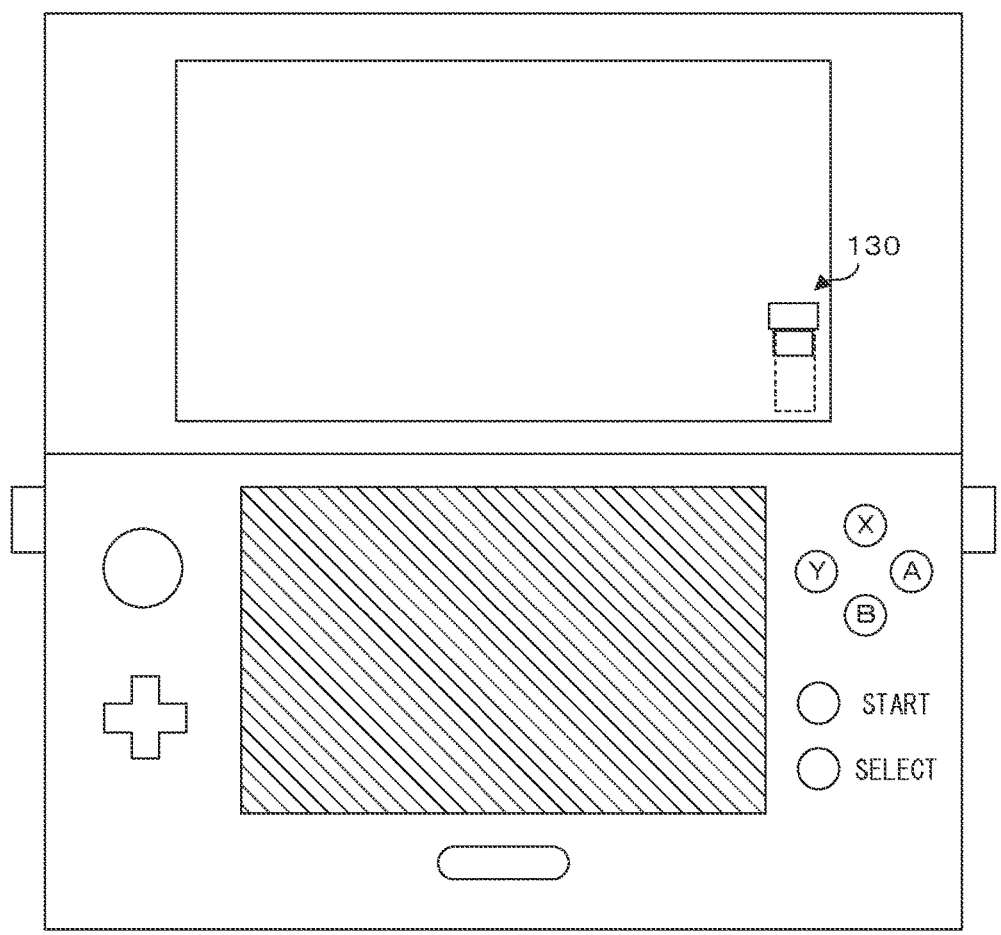
FIG. 11 is an example non-limiting schematic diagram illustrating the state of a game machine in which a tool bar is not displayed.

In the game machine 1 according to the present embodiment, if the second operation reception unit 23 receives the operation for any one of the hardware keys in the operation unit 5, the display processing unit 21 performs processing of making non-display, i.e. hiding, the tool bar 110 which is displayed on the second display 4. FIG. 11 is an example non-limiting schematic diagram illustrating the state of the game machine 1 in which the tool bar 110 is made non-display. The example illustrated in FIG. 11 shows a display example in the case where the user performs operation for the analog stick 51, cross key 52 or the like of the operation unit 5 in the game machine 1 of the state as illustrated in FIG. 3.

It is to be noted that, after the tool bar 110 is made non-display by the operation for a hardware key, the display processing unit 21 continues non-display of the tool bar 110 even in the case where, for example, operation for the hardware key is canceled or the operation for another hardware key is performed.

In other words, the display processing unit 21 in the game machine 1 performs setting by switching between the first mode in which a Web page and the tool bar 110 are both displayed and the second mode in which a Web page is displayed whereas the tool bar 110 is not displayed. The display processing unit 21 switches to the second mode if the operation for a hardware key is performed in the first mode. The display processing unit 21 switches to the first mode if the operation for the touch panel 7 is performed in the second mode.

If the second operation reception unit 23 receives operation for a hardware key in the operation unit 5 while a Web page and the tool bar 110 are displayed on the first display 3 and the second display 4, the display processing unit 21 of the game machine 1 makes the tool bar 110 non-display while displaying the Web page also in a region where the tool bar 110 had been displayed until then. Here, the operation received by the second operation reception unit 23 is valid, and the display processing unit 21, information processing unit 24 or the like performs processing according to the received operation. If, for example, the second operation reception unit 2 receives enlargement operation by the X button 53, the display processing unit 21 makes the tool bar 110 non-display while enlarging a Web page.

However, in the case where a menu screen is displayed in response to the pushing operation for the start button 57 or where a bookmark screen is displayed in response to the pushing operation for the select button 58, the display processing unit 21 displays the balloon 122 for the menu screen or the balloon 121 for the bookmark screen together with the tool bar 110. Thereafter, in the case where, for example, operation of selecting a menu item, bookmark or the like is performed through a hardware key, or cancelling operation is performed through the B button 56, the display processing unit 21 makes the tool bar 110 non-display along with the menu screen or bookmark screen. That is, in the case where the condition for making the menu screen or bookmark screen non-display is satisfied without the use of the touch panel 7, the display processing unit 21 makes the tool bar 110 non-display along with the menu screen or bookmark screen.

In the case where the first operation reception unit 22 receives operation for the touch panel 7 in the state where the tool bar 110 is not displayed, the tool bar 110 is displayed on the second display 4. In the present embodiment, the operation received by the first operation reception unit 22 here is valid, and the display processing unit 21, information processing unit 24 or the like performs processing in response to the received operation. For example, if the first operation reception unit 22 receives touching operation for the link of a Web page displayed on the second display 4, the display processing unit 21 displays the tool bar 110 while the information processing unit 24 performs communication through the communication unit 14 so as to display a Web page associated with the link to be operated. The game machine 1 may, however, be configured to only display the tool bar 110 while invalidating the operation received by the first operation reception unit 22 in the state where the tool bar 110 is not displayed.

<Flowchart>

Figure 12:
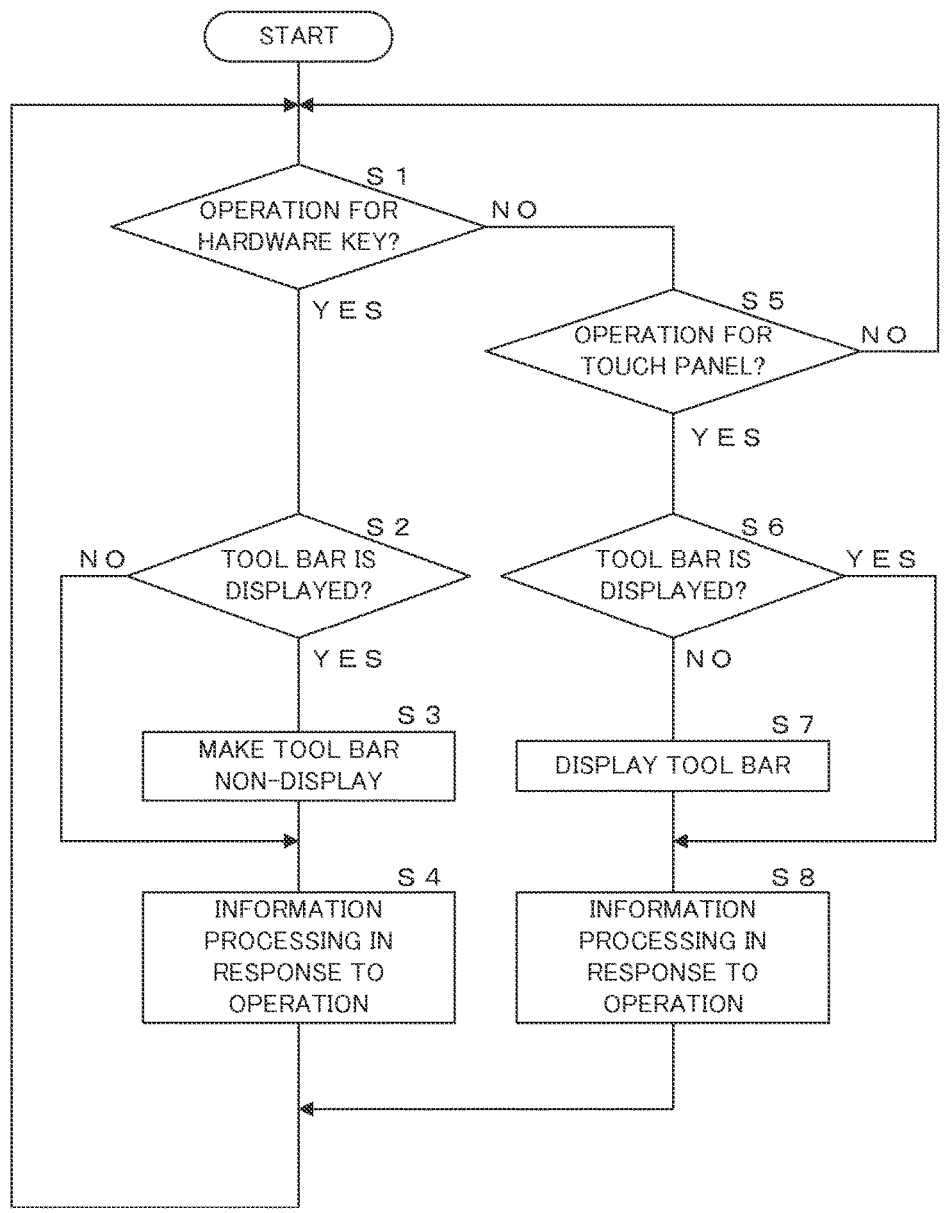
FIG. 12 is an example non-limiting flowchart illustrating a procedure of switch processing between display and non-display of a tool bar performed by a game machine.

FIG. 12 is an example non-limiting flowchart illustrating a procedure of switching processing between display and non-display of the tool bar 110 performed by the game machine 1. The processing unit 10 in the game machine 1 determines whether or not operation for a hardware key in the operation unit 5 has been received by the second operation reception unit 23 (step S1). If the operation for a hardware key has not been received (S1: NO), the processing unit 10 determines whether or not operation for the touch panel 7 has been received by the first operation reception unit 22 (step S5). If the operation for the touch panel 7 has not been received (S5: NO), the processing unit 10 returns the processing to step S1, and waits until the operation for a hardware key or touch panel 7 is received.

If the operation for a hardware key has been received (S1: YES), the processing unit 10 determines whether or not the tool bar 110 is being displayed on the second display 4 (step S2). If the tool bar 110 is being displayed (S2: YES), the display processing unit 21 makes the tool bar 110 non-display (step S3), and proceeds to step S4. If the tool bar 110 is not being displayed (S2: NO), the processing unit 10 proceeds to step S4. The information processing unit 24 in the processing unit 10 performs information processing in response to the operation for the hardware key received by the second operation reception unit 23 (step S4), and returns the processing to step S1.

If the operation for the touch panel 7 has been received (S5: YES), the processing unit 10 determines whether or not the tool bar 110 is being displayed on the second display 4 (step S6). If the tool bar 110 is not being displayed (S6: NO), the display processing unit 21 displays the tool bar 110 on the second display 4 (step S7), and proceeds to step S8. If the tool bar 110 is being displayed (S6: YES), the processing unit 10 proceeds to step S8. The information processing unit 24 in the processing unit 10 performs information processing in response to the operation for the touch panel 7 received by the first operation reception unit 22 (step S8), and returns the processing to step S1.

The processing from steps S1 to S3 in the present flowchart corresponds to the setting process for the second mode in which a Web page is displayed whereas the tool bar 110 is not displayed. The processing of steps S5 to S7 in the present flowchart corresponds to the setting process for the first mode in which a Web page and the tool bar 110 are displayed.

Figure 13:
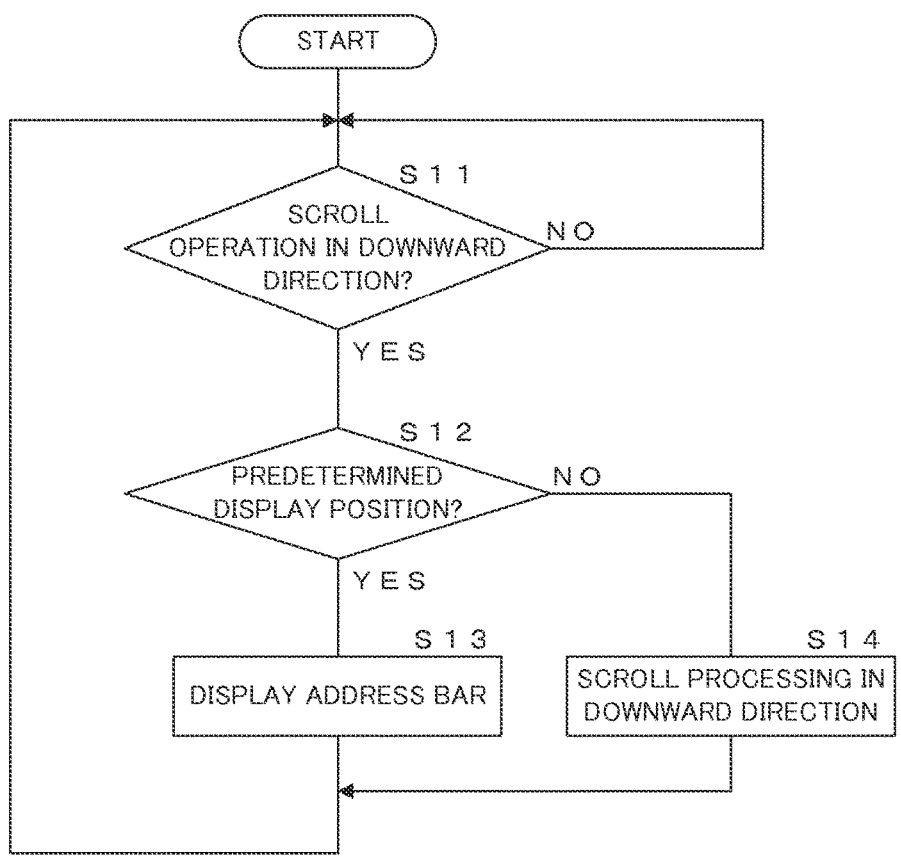
FIG. 13 is an example non-limiting flowchart illustrating a procedure of display processing of an address bar performed by a game machine.

FIG. 13 is an example non-limiting flowchart illustrating a procedure of display processing for the address bar 140 performed by the game machine 1. The processing unit 10 of the game machine 1 determines whether or not the scroll operation in the downward direction has been received by the first operation reception unit 22 or the second operation reception unit 23 (step S11). If the scroll operation in the downward direction has not been received (S11: NO), the processing unit 10 waits until the scroll operation in the downward direction is received.

If the scroll operation in the downward direction has been received (S11: YES), the processing unit 10 determines whether or not the display position of the Web page corresponds to a predetermined display position (S12: YES). Here, the predetermined display position is a display position where the upper end of the Web page corresponds to the upper end of the second display 4. If the display position of a Web page is the predetermined display position (S12:

YES), the display processing unit 21 displays the address bar 140 on the second display 4 (step S13), and returns the processing to step S11. If the display position of the Web page is not the predetermined display position (S12: NO), the display processing unit 21 performs scroll processing in the downward direction for the Web page displayed on the first display 3 and the second display 4 (step S14), and returns the processing to step S11. In the case where the scroll operation in the upward direction is received by the first operation reception unit 22 or the second operation reception unit 23 in the state where the address bar 140 is displayed, the display processing unit 21 makes the address bar 140 non-display.

CONCLUSION

The game machine 1 according to the present embodiment having the configuration described above includes the operation unit 5 constituted by a hardware key and a touch panel 7 detecting touching operation for the second display 4. The display processing unit 21 in the game machine 1 displays a Web page on the second display 4 as a processing result of an Internet browser application. The display processing unit 21 displays the tool bar 110 for receiving the operation related to this application on the second display 4. The first operation reception unit 22 of the game machine 1 receives operation associated with each operation receiving region in the tool bar 110 by detecting the touching operation for the tool bar 110 with the touch panel 7. The second operation reception unit 23 may receive operation equivalent to the operation associated with each operation receiving region in the tool bar 110 by the operation for the operation unit 5 of a hardware key. The information processing unit 24 performs information processing in response to the operation received by the first operation reception unit 22 or the second operation reception unit 23.

In the case where the second operation reception unit 23 has received the operation for the operation unit 5 through a hardware key, the display processing unit 21 in the game machine 1 according to the present embodiment hides the tool bar 110 that has been displayed on the second display 4. This can automatically make an unnecessary tool bar 110 non-display in the case where the user performs operation by means of the operation unit 5. It is thus possible to allocate the region in which the tool bar 110 had been displayed to another necessary image, which can enhance the convenience of the game machine 1. For the image that may be displayed in the region where the tool bar 110 had been displayed, various images may be employed such as, in addition to a Web page, instructions for operation utilizing a hardware key, information on the title or the like of a Web page, or an advertisement related to a Web page, for example.

In the case where the tool bar 110 is made non-display as described above, the display processing unit 21 in the game machine 1 displays the image of a Web page in the region where the tool bar 110 had been displayed. More specifically, the display processing unit 21 displays a Web page by utilizing a region including the region where the tool bar 110 had been displayed and the region where the Web page had been displayed before the tool bar 110 is hidden. This allows the user who performs operation through the operation unit 5 of a hardware key to utilize a wider area of the second display 4 in the game machine 1.

In the case where the first operation reception unit 22 has received the operation for the touch panel 7 after the tool bar 110 is made non-display, the display processing unit 21 in the game machine 1 displays the tool bar 110 on the second display 4. This allows the user who performs operation through the operation unit 5 to easily perform operation by means of the touch panel 7.

In the case where the second operation reception unit 23 has received the operation for the operation unit 5, the processing unit 10 of the game machine 1 causes the display processing unit 21 not to display the tool bar 110 and the information processing unit 24 to perform information processing in response to the operation received by the second operation reception unit 23. That is, the processing unit 10 receives the operation for the operation unit 5 that is performed in the state where the tool bar 110 is being displayed as valid. The processing unit 10 performs both processing of making the tool bar 110 non-display by the display processing unit 21 and information processing by the information processing unit 24 according to received operation. This can prevent the processing of making the tool bar 110 non-display from hindering the use of the game machine 1 by the user.

While the present embodiment described the game machine 1 as an example of an information processing device, the application of the present technique is not limited to the game machine 1. For example, a similar technique may be applied to various information processing devices such as a general-purpose computer, a tablet terminal device or a mobile phone. A similar technique may also be applied to various devices provided with a touch panel and a hardware key, such as a microwave oven, refrigerator, air conditioner, printer, audio device or television device, or a remote controller associated with these devices.

Though the present embodiment described a configuration in which one information processing device performs processing, the present technique is not limited to the configuration. For example, in the case where the game machine 1 is configured to communicate with a server device, the server device may perform at least a part of the processing that has been described as performed by the game machine 1 in the present embodiment. If, for example, the game machine 1 has a remote controller, the game machine 1 and the remote controller may be configured to perform processing separately from each other.

While, in the present embodiment, the processing unit 10 of the game machine 1 executes the information processing program 91a so as to implement the display processing unit 21, the first operation reception unit 22, the second operation reception unit 23, the information processing unit 24 and the like as software functional blocks, the present technique is not limited to this configuration. A part or all of the display processing unit 21 to information processing unit 24 may be implemented as hardware functional blocks in the game machine 1. The information processing program 91a may be a program such as an operating system, not limited to an application program. It may also be so configured that a part of the functions described in the present embodiment as being implemented by the information processing program 91a is held by an operating system which cooperates with the information processing program 91a to perform processing.

While the game machine 1 has a configuration in that the first display 3 and the second display 4 have different sizes, they may alternatively have the same size, not limited to the illustrated configuration. The game machine 1 may include only one display or more than two displays. Though the touch panel 7 in the game machine 1 is illustrated to be provided only for the second display 4, a touch panel may also be provided for the first display 3, not limited to the illustrated configuration. The number, shapes and arrangement of hardware keys in the operation unit 5 of the game machine 1 illustrated in FIG. 1 or the like are mere examples, but are not limited to the illustrated configuration. The screen displays of the first display 3 and the second display 4 in the game machine 1 illustrated in FIG. 3 or the like are mere examples and the present technique is not limited to the illustrated examples. The processing procedure or the like of the game machine 1 illustrated in the present embodiment is a mere example and the present technique is not limited to the illustrated procedure.

When used in the present specification, each element or the like denoted in a singular form with a word "a" or "an" attached in front thereof is to be understood not to eliminate the possibility of a plurality of elements related thereto.

The present technique may enhance the convenience of, for example, an information processing device.

What is claimed is:

1. A non-transitory recording medium in which an information processing program is recorded, the program causing an information processing device including a display, a hardware key and a touch panel on the display to provide operation comprising:
    a display processing for performing processing of displaying, on the display, an image concerning a processing result of an application and an operation receiving image for receiving an operation related to the application;
    a first operation reception for receiving an operation associated with the operation receiving image by detecting contact with the operation receiving image through the touch panel;
    a second operation reception for receiving an operation equivalent to the operation associated with the operation receiving image through operation for the hardware key; and
    an information processing for performing information processing concerning the application in response to operation received by the first operation reception or the second operation reception, wherein:
    the display processing makes the operation receiving image non-display when the second operation reception receives an operation; and
    the display processing displays the operation receiving image at a time of activating the application.

2. The recording medium according to claim 1, wherein when the operation receiving image is made non-display, the display processing displays an image concerning a processing result of the application in a region where the operation receiving image had been displayed.

3. The recording medium according to claim 2, wherein when the operation receiving image is made non-display, the display processing displays an image concerning a processing result of the application in a region including a region where an image concerning a processing result of the application had been displayed and a region where the operation receiving image had been displayed.

4. The recording medium according to claim 1, wherein after the operation receiving image is made non-display, the display processing maintains non-display of the operation receiving image even if the operation received by the second operation reception is not continuous.

5. The recording medium according to claim 1, wherein when contact with the display is detected through the touch panel after the operation receiving image is made non-display, the display processing displays the operation receiving image.

6. The recording medium according to claim 1, wherein when the second operation reception receives an operation, the display processing makes the operation receiving image non-display while the information processing performs information processing in response to operation received by the second operation reception.

7. An information processing device including a display, a hardware key and a touch panel on the display, comprising:
    a display processing unit performing processing of displaying, on the display, an image concerning a processing result of an application and an operation receiving image for receiving an operation related to the application;
    a first operation reception unit receiving an operation associated with the operation receiving image by detecting contact with the operation receiving image through the touch panel;
    a second operation reception unit receiving an operation equivalent to operation associated with the operation receiving image through operation for the hardware key; and
    an information processing unit performing information processing concerning the application in response to operation received by the first operation reception unit or the second operation reception unit wherein:
    the display processing unit makes the operation receiving image non-display when the second operation reception unit receives an operation; and
    the information processing device is a handheld device operable through the hardware key by a user holding the information processing device.

8. An information processing device comprising:
    a display;
    a hardware key;
    a touch panel on the display; and
    a processor configured to
        display a content image and a touch image on the display;
        receive a first input in response to detect a contact with the touch image through the touch panel;
        receive a second input in response to detect an operation to the hardware key; and
        perform information processing based on a first input or the second input, wherein the processor is configured to hide the touch image when receiving the second input, and
    the information processing based on the first input is equivalent to the information processing based on the second input;
    the information processing device is a handheld device operable through the hardware key by a user holding the information processing device.

9. The information processing device according to claim 8, further comprising a plurality of hardware keys, wherein:
    the touch image comprises a toolbar for operating the application, the toolbar having a plurality of selectable regions which are respectively associated with the plurality of hardware keys for providing respective equivalent operations; and
    the toolbar becomes hidden upon operation of one of the plurality of hardware keys respectively associated with one of the plurality of selectable regions of the toolbar.

10. An information processing method performing information processing using an information processing device including a display, a hardware key and a touch panel on the display, comprising:

displaying, by the information processing device, an image concerning a processing result of an application and an operation receiving image for receiving an operation related to the application on the display;

receiving, by the information processing device, operation associated with the operation receiving image by detecting contact with the operation receiving image through the touch panel, receiving, by the information processing device, operation equivalent to operation associated with the operation receiving image through operation for the hardware key;

performing, by the information processing device, information processing concerning the application in response to operation received through the touch panel or the hardware key; and making the operation receiving image non-display when the equivalent operation is received through the hardware key;

the displaying displays the operation receiving image at a time of activating the application.

11. The information processing method according to claim 10, wherein:

the information processing device includes a plurality of hardware keys;

the operation receiving image comprises a toolbar for operating the application, the toolbar having a plurality of selectable regions which are respectively associated with the plurality of hardware keys for providing respective equivalent operations; and the toolbar becomes non-displayed upon operation of one of the plurality of hardware keys respectively associated with one of the plurality of selectable regions of the toolbar.

12. A non-transitory recording medium in which an information processing program is recorded, the program causing an information processing device including a display, a hardware key and a touch panel on the display to provide operation comprising:

a display processing for performing processing of displaying, on the display, an image concerning a processing result of an application and an operation receiving image for receiving an operation related to the application;

a first operation reception for receiving an operation associated with the operation receiving image by detecting contact with the operation receiving image through the touch panel;

a second operation reception for receiving an operation equivalent to the operation associated with the operation receiving image through operation for the hardware key; and an information processing for performing information processing concerning the application in response to operation received by the first operation reception or the second operation reception, wherein:

the display processing makes the operation receiving image non-display when the second operation reception receives an operation;

the information processing device includes a plurality of hardware keys;

the operation receiving image comprises a toolbar for operating the application, the toolbar having a plurality of selectable regions which are respectively associated with the plurality of hardware keys for providing respective equivalent operations; and the toolbar becomes non-displayed upon operation of one of the plurality of hardware keys respectively associated with one of the plurality of selectable regions of the toolbar.

* * * * *